(12) United States Patent
Oku (10) Patent No.: US 6,433,502 B2
(45) Date of Patent: Aug. 13, 2002

(54) SPINDLE MOTOR DRIVER CIRCUIT

(75) Inventor: Koichiro Oku, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/879,951

(22) Filed: Jun. 14, 2001

(30) Foreign Application Priority Data

Jun. 16, 2000 (JP) ........................................ 2000-182202

(51) Int. Cl.[7] .............................................. G05B 11/28
(52) U.S. Cl. ...................... 318/599; 318/254; 318/138; 318/439; 360/75
(58) Field of Search ................................ 318/599, 254; 360/75

(56) References Cited

U.S. PATENT DOCUMENTS

| | | | |
|---|---|---|---|
| 4,839,754 A | * 6/1989 | Gami et al. | 360/73.01 |
| 5,196,769 A | * 3/1993 | Chiba et al. | 318/39 |
| 5,208,518 A | * 5/1993 | Grapenthin et al. | 318/138 |
| 5,905,347 A | * 5/1999 | Kocis | 318/254 |
| 6,262,545 B1 | * 7/2001 | Yamamoto | 318/254 |

* cited by examiner

*Primary Examiner*—Robert E. Nappi
*Assistant Examiner*—Rita Leykin
(74) *Attorney, Agent, or Firm*—Young & Thompson (57) ABSTRACT

The spindle motor drive circuit includes a power source voltage varying device for varying a voltage applied to a motor by controlling a power source voltage, and a pulse width varying device for varying a pulse width by pulse width modulation.

5 Claims, 6 Drawing Sheets

SPINDLE MOTOR DRIVER CIRCUIT

BACKGROUND OF THE INVENTION

1. Field of the Invention

The present invention relates to a spindle motor driving circuit using PWM (pulse width modulation) control and VM (applied voltage) control.

2. Description of the Related Art

Figure 5:
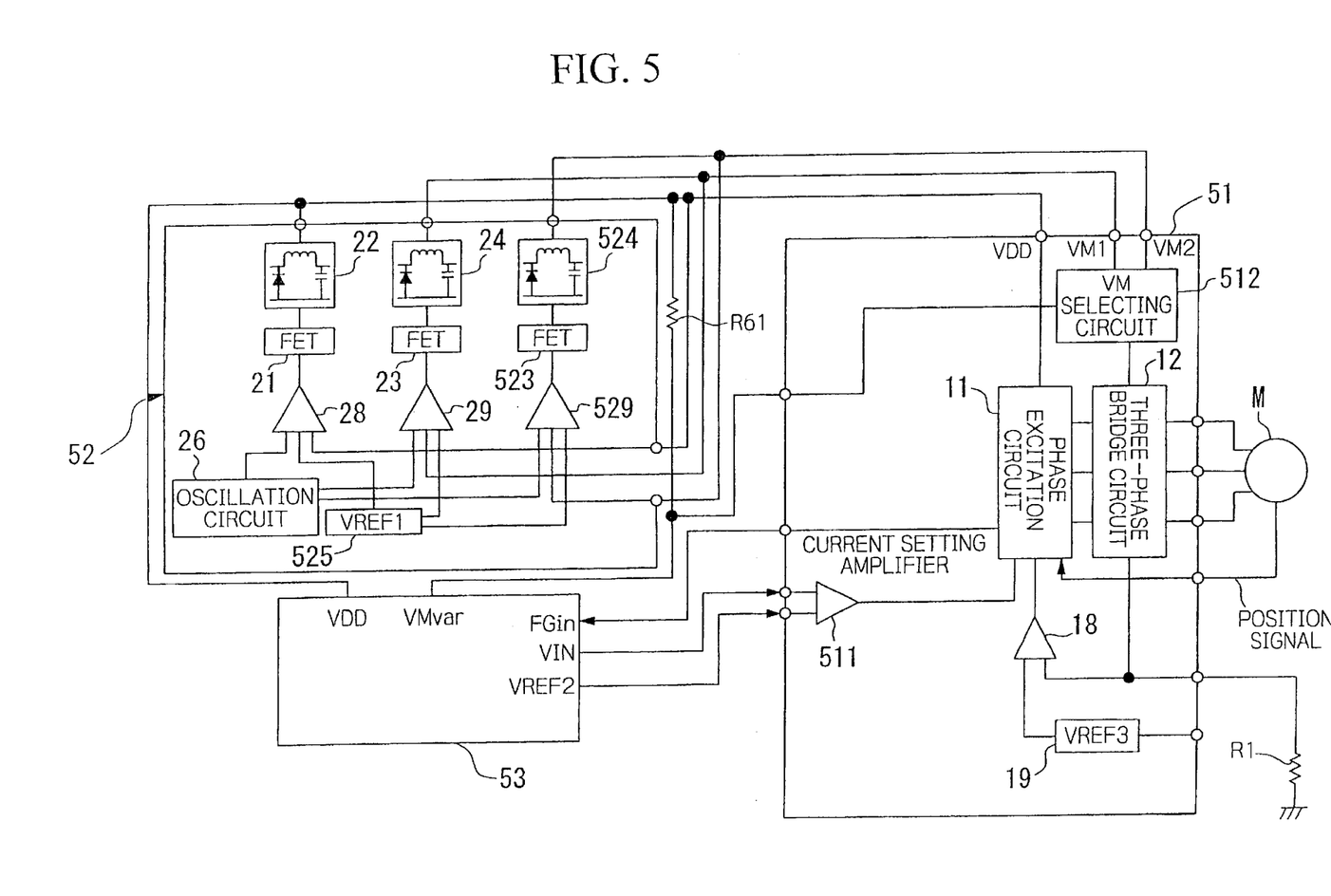
FIG. 5 is a block diagram showing the structure of the conventional spindle motor drive circuit using the VM variable linear drive technique.

FIG. 5 is a block diagram showing a conventional spindle motor driving circuit which achieves general VM variable linear drive.

A spindle motor driver 51 does not have a circuit for controlling a duty cycle, but has an electric current setting amplifier 511 and a VM selecting circuit 512, which differ from the PWM control method which is described below.

The linear drive method directly controls an output electric current of an output three-phase bridge depending on an input voltage, to drive the spindle motor at a predetermined speed. In the linear drive method, an electric current setting amplifier 511 outputs a signal depending on a signal VREF2-VIN, and this output controls a phase excitation circuit 11.

A circuit (using two power sources) in FIG. 5 has two systems of VM power sources in a switching regulator 52. In response to an external logic signal, a VM selecting circuit selects one of VM1 and VM2 as the VM power source.

Figure 6:
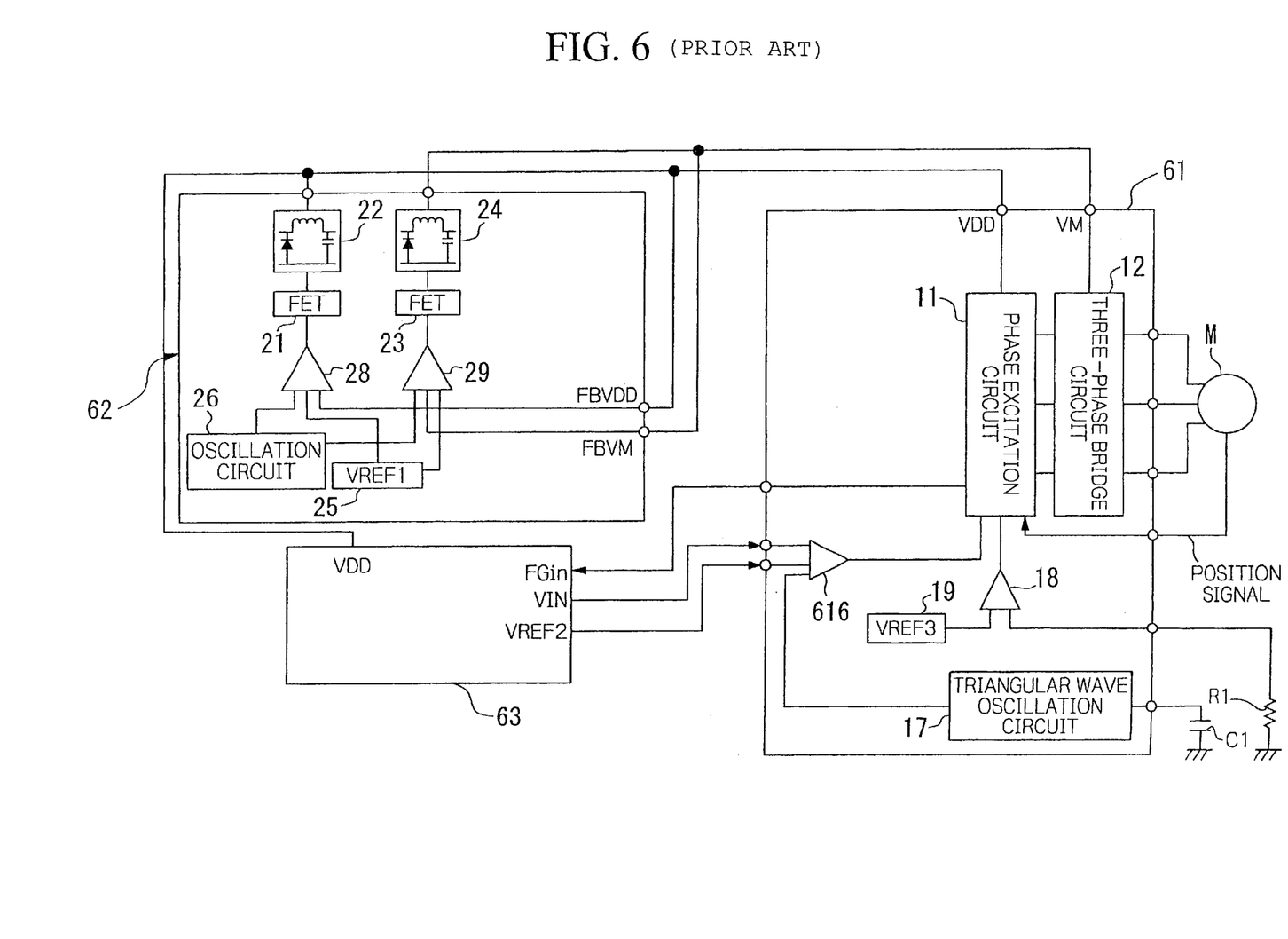
FIG. 6 is a block diagram showing the structure of a conventional spindle motor drive circuit using the PWM control.
Figure 7:
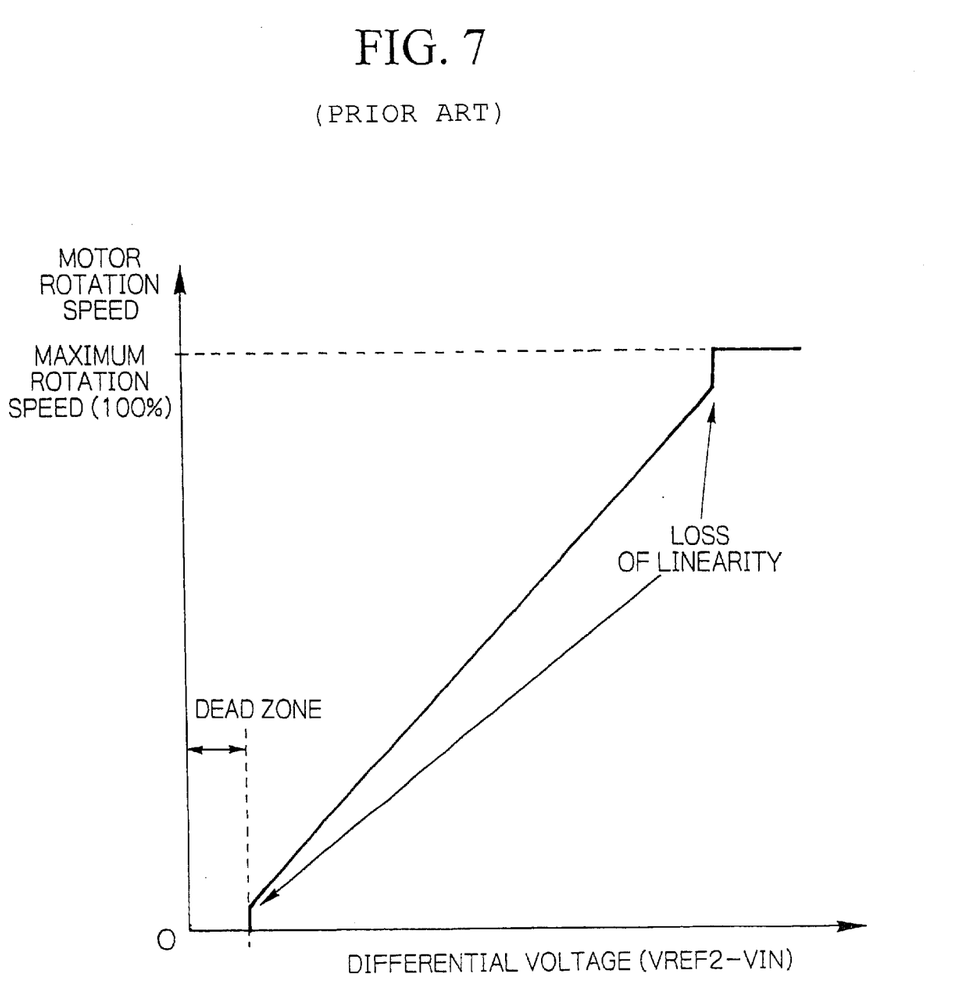
FIG. 7 is a diagram showing the relationship between the control signal voltage and the motor rotation speed in the conventional spindle motor drive circuit using the PWM control.

FIG. 6 shows the structure of the conventional PWM control spindle motor driving circuit, and FIG. 7 shows motor speed/input differential voltage characteristics.

The PWM control spindle motor driving circuit shown in FIG. 6 comprises a spindle motor driver 61, a switching regulator 62, and a control circuit 63.

The spindle motor driver 61 comprises a phase excitation circuit 11, a duty cycle setting comparator 616, a reference power source (VREF3) 19, a triangular wave oscillation circuit 17, and a three-phase bridge circuit 12 controlled by an excess current restriction comparator 18 and a phase excitation circuit 11.

A differential voltage between VREF2 and VIN of the control circuit 63 is input to the duty cycle setting comparator 616 in the spindle motor driver 61, and is compared with triangular waves from the triangular wave oscillation circuit 17, to thereby produce rectangular waves. The rectangular waves are supplied as the gate voltage of the three-phase bridge circuit 12. The PWM switching of the three-phase bridge circuit 12 is performed based on the gate voltage, and the electric current in the spindle motor M is thus adjusted so that the characteristics shown in FIG. 7 are achieved.

The linear driving method shown in FIG. 5, however, increases the electric power consumption because the method drives the motor based on the electric current and because this electric current flows continuously. Therefore, heat production is increased when driving the motor at a high speed or when starting the motor.

The PWM driving method shown in FIG. 6 eliminates the problem of the power consumption, but makes the setting of the duty cycle (the on-duty cycle setting) around the minimum speed of the motor and around the maximum speed difficult. Therefore, a dead zone occurs depending on the off-set voltage of the circuit, the linearity characteristics deteriorate, the control of speed around the minimum and maximum rotation speeds becomes difficult, and therefore the access time is lengthened when the motor is used in a disk drive.

BRIEF SUMMARY OF THE INVENTION

It is therefore an object of the present invention to provide a spindle motor driving circuit which can operate linearly from the minimum rotation speed to the maximum rotation speed.

In the first aspect of the present invention, the spindle motor drive circuit comprises: a power source voltage varying device for varying the voltage applied to the motor by controlling the power source voltage; and a pulse width varying device for varying the pulse width by pulse width modulation.

In the second aspect of the present invention, the power source voltage varying device varies the voltage around a minimum rotation speed of the motor or around a maximum rotation speed of the motor.

In the third aspect of the present invention, the power source voltage device sets the minimum pulse width or the maximum pulse width as the fixed pulse width.

In the fourth aspect of the present invention, the applied voltage and the pulse width are controlled based on the differential voltage between the control reference voltage and the control input voltage.

According to the present invention, in the high duty cycle and the low duty cycle regions, the applied voltage is controlled. In the other regions, the applied voltage is fixed, and PWM control is performed. Therefore, the input dead zone can be eliminated, and the linearity of the characteristics from low rotation speeds to high rotation speeds can be improved.

Further, in the high duty cycle region, the applied voltage is increased so that the maximum rotation speed is increased. Therefore, the maximum torque can be advantageously increased.

DETAILED DESCRIPTION OF THE INVENTION

Figure 1:
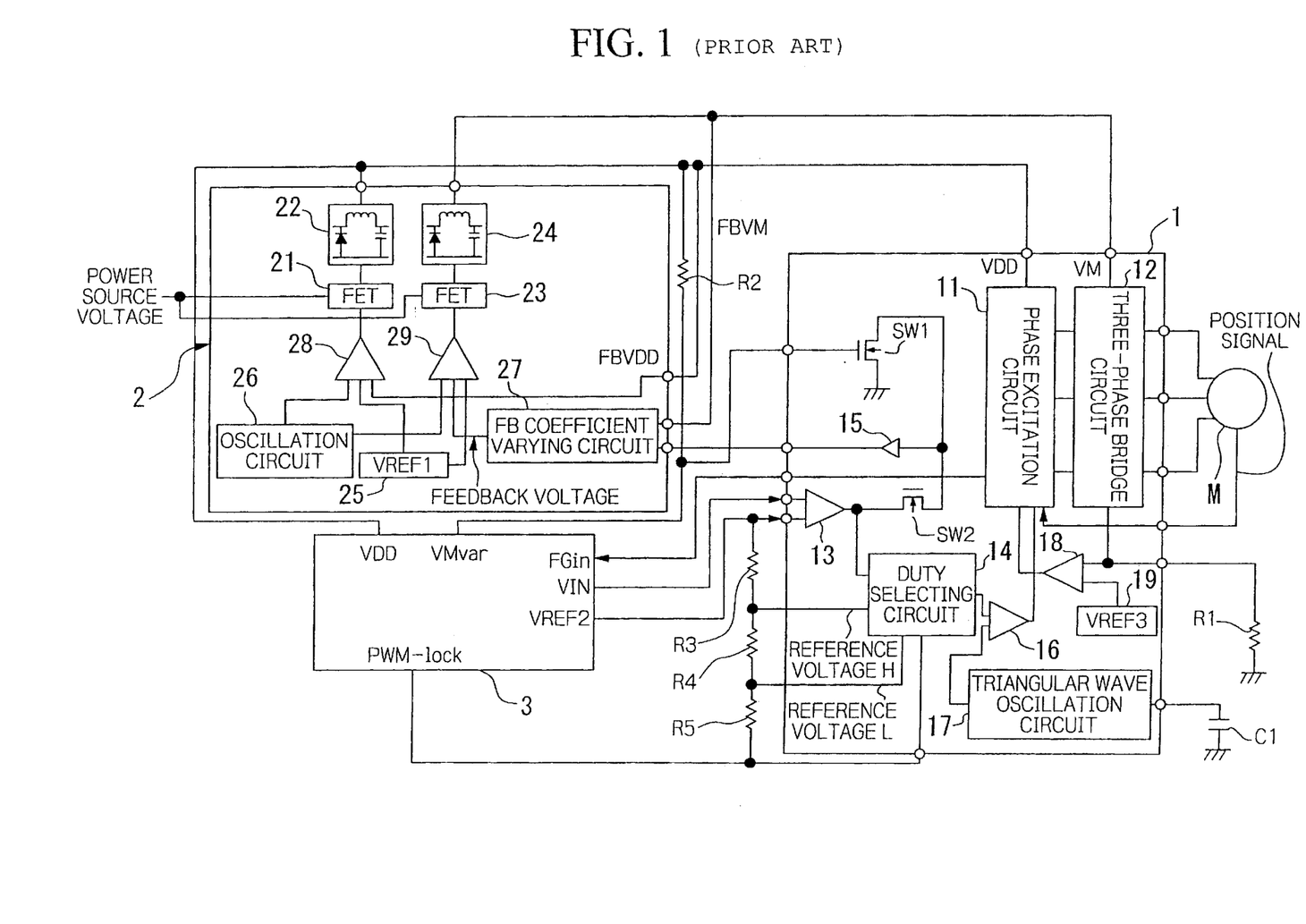
FIG. 1 is a block diagram showing the structure of the spindle motor drive circuit of the present invention.

The embodiment of the present invention will be explained with reference to the drawings. FIG. 1 is a block diagram showing the structure of the spindle motor driving circuit of the present invention. FIG. 2 is a diagram showing the relationship between the control voltage signal and the duty cycle of the PWM control.

The spindle motor driving circuit shown in FIG. 1 comprises a spindle motor driver 1, a switching regulator 2, and a control circuit 3.

The spindle motor driver 1 for driving a spindle motor M has a phase excitation circuit 11 for outputting an excitation signal for each phase, a three-phase bridge circuit 12 which is excited by the phase excitation circuit 11. Further, the spindle motor driver 1 has an input differential voltage amplifier 13 for comparing and amplifying the control input from the control circuit 3, a duty cycle selecting circuit 14, and a duty cycle setting comparator 16 which operates as a circuit for producing a control signal to be supplied to the phase excitation circuit 11. Further, the spindle motor driver 1 has a triangular wave oscillation circuit 17, and an external capacitor for triangular wave oscillation which oscillate triangular waves as the reference of the output pulse width, and has motor voltage varying setting switches SW1 and SW2. In addition, the spindle motor driver 1 has a comparison amplifier 18 for controlling excess currents, a reference voltage source (VREF3), and an external excess current setting resistor R1.

The switching regulator 2 comprises a switching element (FET) 21 and a filter circuit 22 which generate a control power source VDD which is for one of two power source systems, and a switching element (FET) 23 and a filter circuit 24 which generate a power VM for driving the spindle motor M.

The FETS 21 and 23 are controlled by comparison amplifiers 28 and 29 which operate depending on the outputs of the reference voltage source (VREF1) 25, the oscillation circuit 26, and the FB coefficient varying circuit 27.

The FB coefficient varying circuit 27 is provided in a feedback group of the motor power source VM, and controls the feedback voltage depending on the output of the input differential amplifier 13 of the spindle motor driver 1.

The control circuit 3, whose internal circuit is not shown, has a speed pulse input FGin for receiving a rotation speed signal output from the phase excitation circuit 11 of the spindle motor driver 1, a VREF2 for providing a control reference signal, a VIN for providing a control signal, a VMvar for setting the mode to a motor voltage variable mode, and a PWM-lock for fixing or varying the PWM on-duty cycle (the pulse width) of the spindle motor driver 1.

The operation of the present invention will be explained with reference to FIG. 1.

The main power sources for the spindle motor driver 1 are the power source VDD for the control circuit and the power source VM for driving the motor. The signals VREF2 and VIN are input to the input differential amplifier 13. The input differential amplifier 13 outputs a signal in proportion to the differential voltage which is VREF2-VIN. The differential voltage signal is input to the duty cycle selecting circuit 14.

The reference voltages H and L which have been divided and generated by the resistors R3, R4, and R5 based on the VREF2 are input to the duty cycle selecting circuit.

The reference voltages H and L are used to set the fixed values of the maximum duty cycle and the minimum duty cycle. The setting of the fixed cycle duty mode or the variable mode depends on the PWM-lock signal from the control circuit 3.

When the PWM-lock signal is at the high level, the output of the input differential amplifier 13 is always selected by the duty cycle selecting circuit.

When the PWM-lock signal is at the low level, and when the reference voltage H<(VIN-VREF2), the reference voltage H is selected by the duty cycle selecting circuit. When the PWM-lock signal is at the low level, and when the reference voltage L<(VREF2-VIN), the (VREF2-VIN) is selected by the duty cycle selecting circuit 14.

The output of the duty cycle selecting circuit is input to the duty cycle setting comparator 16. That is, one of the output of the input differential amplifier 13, the reference voltage H, and the reference voltage L, which is selected by the duty cycle selecting circuit 14 is input, and the triangular wave oscillation signal generated by the triangular wave oscillation circuit 17 is input.

In the duty cycle setting comparator 16, the triangular waves intersect the output signal selected by the duty cycle selecting circuit 14, and the phase excitation circuit 11 produces rectangular waves for the PWM in the cycle based on the intersections. The rectangular waves are input to a gate terminal (not shown) of the three-phase bridge circuit 12.

Figure 2A:
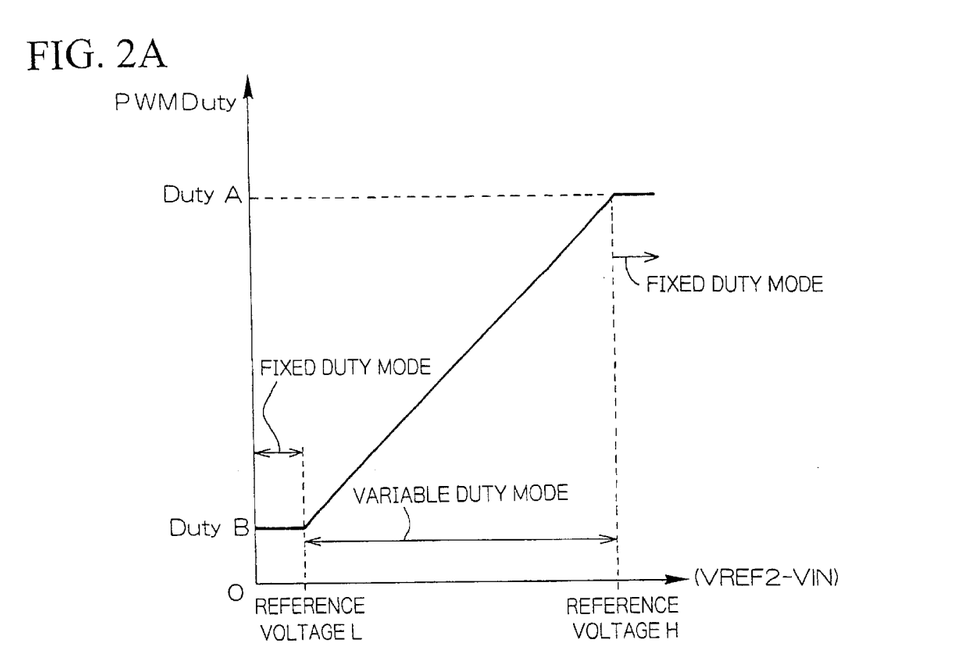
FIGS. 2A and 2B are diagrams showing the relationship between the control voltage and the duty cycle under the PWM control according to the present invention.
Figure 2B:
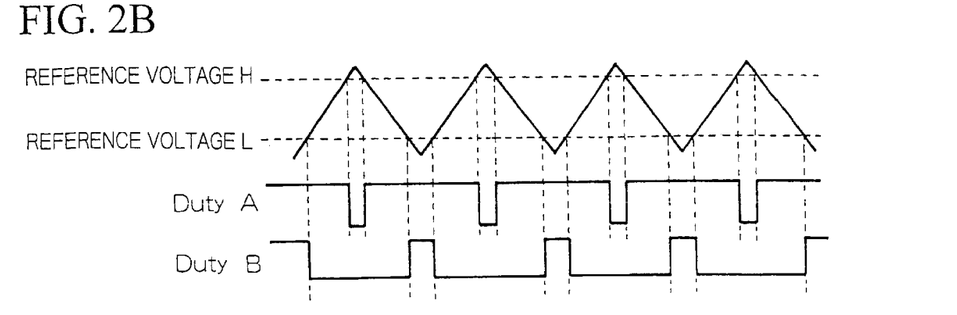

As shown in FIGS. 2A and 2B, when the PWM-lock signal is at the low level, the PWM for the low duty cycle is in the fixed cycle duty mode based on the reference voltage L, the PWM for the high duty cycle is in the fixed cycle duty mode based on the reference voltage H, and the PWM for the medium duty cycle is in the PWM variable mode based on the value VIN-VREF2.

The output of the input differential amplifier 13 is input via the switch SW2 to the FB coefficient varying circuit 27 of the switching regulator 2. The FB coefficient varying circuit 27 is provided in the feedback group of the switching regulator 2, and varies the FB coefficient according to the signal output from the input differential amplifier 13 to vary the VM voltage.

The gate signal of the switch SW2 is input from the duty cycle selecting circuit 14. When the duty cycle selecting circuit 14 selects the fixed cycle duty mode (when the reference voltage H or L is selected), the signal at the high level is output.

Therefore, the output of the input differential amplifier is input to the FB coefficient varying circuit 27 only in the fixed cycle duty mode.

Figure 3:
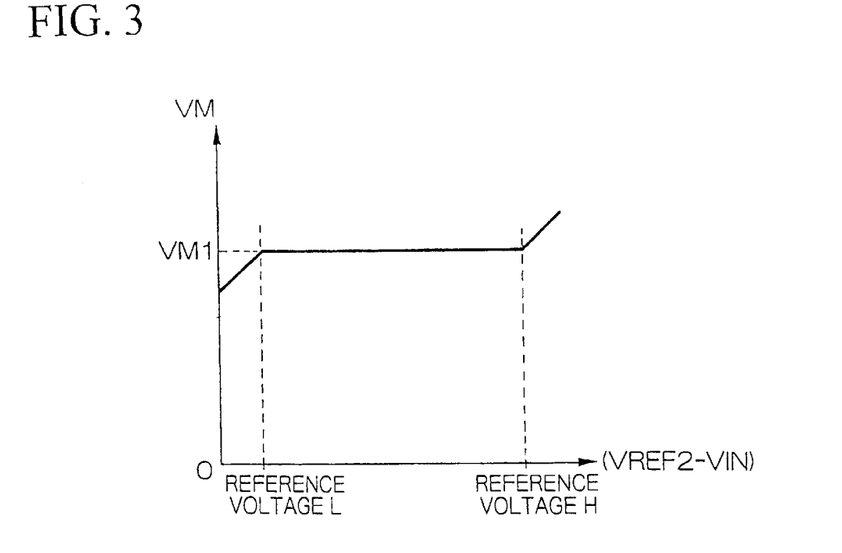
FIG. 3 is a diagram showing the operation of an FB coefficient varying circuit of the present invention.

Next, the operation of the FB coefficient varying circuit 27 will be explained with reference to FIG. 3. In the variable duty cycle mode, the FB coefficient varying circuit 27 does not operate, and therefore a fixed motor voltage (VM1) is produced. Then, as the duty cycle decreases or increases to the reference voltage L or H, the mode enters the fixed cycle duty mode so that the motor voltage VM is controlled.

The FB coefficient varying circuit 27, whose internal circuit is not shown, comprises a bipolar transistor which varies the voltage between the collector and the emitter of the transistor by controlling the base electric current to change the FB coefficient.

The variation of the FB coefficient for a low duty cycle increases the feedback voltage, while the variation of the FB coefficient for a high duty cycle decreases the feedback voltage. As the result, the VM voltage is less than VM1 when the duty cycle is low, and is greater than VM1 when the duty cycle is high.

Referring to FIG. 1, the switch SW1 of the spindle motor driver 1 sets VM to be variable. When the VMvar output of the control circuit 3 is at the high level, the switch SW1 is turned on so that the FB is not varied.

The operation depending on the logic values of VMvar and PWM-lock input from the control circuit will now be explained.

(1) When the VMvar is at the low level and when the PWM-lock is at the low level, the voltage applied to the spindle motor is variable. The VM is variable in the low duty cycle and the high duty cycle regions in which the PWM output of the spindle motor drive circuit is fixed.

That is, when the duty cycle is low, the duty cycle is fixed based on the reference voltage L. When the duty cycle is high, the duty cycle is fixed based on the reference voltage H.

(2) When the VMvar is at the low level, and when the PWM-lock is at the high level, the voltage applied to the spindle motor is variable. The PWM duty cycle depends on the output of the input differential amplifier (the differential voltage of VREF2–VIN), while the output pulse width is a low duty cycle, or a high duty cycle, and the VM is variable.

(3) When VMvar is at the high level, and when PWM-lock is at the low level, the FB coefficient varying circuit does not operate so that the applied voltage VM is fixed.

When the duty cycle is low, the duty cycle is fixed based on the reference voltage L. When the duty cycle is high, the duty cycle is fixed based on the reference voltage H.

(4) When VMvar is at the high level, and when PWM-lock is at the high level, the FB coefficient varying circuit does not operate so that the applied voltage VM is fixed.

The PWM duty cycle depends on the output of the input differential amplifier (the differential voltage of VREF2–VIN). This operation is similar to that of a conventional PWM drive circuit.

Reference numeral 19 in the spindle motor driver 1 denotes a VREF3 which is a reference voltage source for restricting an excess electric current. The comparator 18 compares the VREF3 with the product of the motor electric current and the resistance for restricting the excess electric current. When the VREF3 is less, the output is forcibly turned off.

Figure 4:
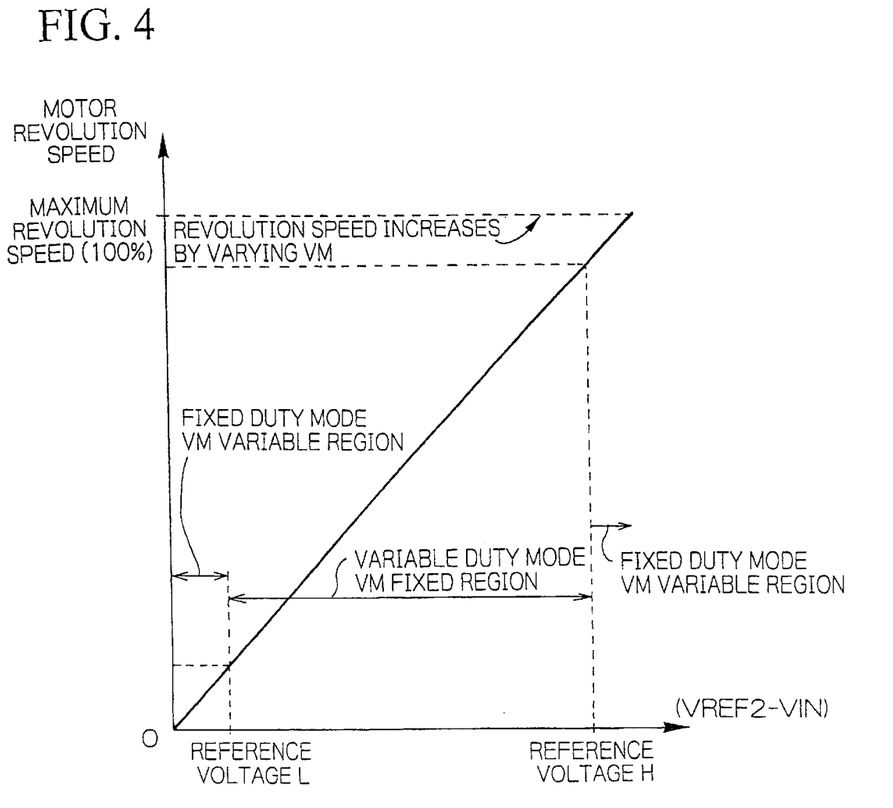
FIG. 4 is a diagram showing the relationship between the control voltage and the rotation speed of the spindle motor according to the present invention.

This control achieves the linear relationship between the control signal voltage and the rotation speed of the spindle motor as shown in FIG. 4.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A spindle motor drive circuit comprising:
   a power source providing a motor operation voltage;
   duty cycle selecting means for selecting one of a fixed duty cycle and a variable duty cycle for the motor operation voltage;
   duty cycle varying means for varying a duty cycle of the motor operation voltage in response to selection of the variable duty cycle by said duty cycle selecting means, the motor operation voltage being fixed; and
   voltage varying means for varying the motor operation voltage at a fixed duty cycle in response to selection of the fixed duty cycle by said duty cycle selecting means.

2. The circuit of claim 1, further comprising means for providing high and low reference voltages, said duty cycle selecting means selecting the fixed duty cycle when a voltage input to said duty cycle selecting means is less than the low reference voltage and greater than the high reference voltage and selecting the variable duty cycle when the voltage input to said duty cycle selecting means is more than the low reference voltage and less than the high reference voltage.

3. The circuit of claim 1, wherein said voltage varying means comprises a feedback coefficient varying circuit that influences the motor operation voltage and that is operated in response to a signal from said duty cycle selecting means.

4. The circuit of claim 1, wherein said duty cycle varying means varies a duty cycle by pulse width modulation.

5. A spindle motor drive circuit comprising:
   a power source providing a motor operation voltage;
   a spindle motor driver with a duty selecting circuit that receives a differential voltage between a control reference voltage and a control input voltage, a low reference voltage, a high reference voltage, and a duty cycle lock signal and that provides an output that is used to provide one of a fixed duty cycle and a variable duty cycle for the motor operation voltage based on the duty cycle lock signal, and
   a pulse width modulation circuit that receives the output from the duty selecting circuit and that provides an output that varies a duty cycle of the motor operation voltage with the motor operation voltage being fixed;
   a control circuit that provides the control reference voltage, the control input voltage, and the duty cycle lock signal, the duty cycle lock signal selecting the fixed duty cycle when the differential voltage is less than the low reference voltage and greater than the high reference voltage and selecting the variable duty cycle when the differential voltage is more than the low reference voltage and less than the high reference voltage;
   plural resistors connected in series that provide the high and low reference voltages; and
   a switching regulator with a feedback coefficient varying circuit that receives the differential voltage in response to a signal from the duty selecting circuit and that provides an output that varies the motor operation voltage at a fixed duty cycle.

* * * * *

UNITED STATES PATENT AND TRADEMARK OFFICE
CERTIFICATE OF CORRECTION

PATENT NO.    : 6,433,502 B2
DATED         : August 13, 2002
INVENTOR(S)   : Oku It is certified that error appears in the above-identified patent and that said Letters Patent is hereby corrected as shown below:

Title page,
Item [54], change "SPINDLE MOTOR DRIVER CIRCUIT" to -- SPINDLE MOTOR DRIVE CIRCUIT --.

Signed and Sealed this

First Day of July, 2003

JAMES E. ROGAN
*Director of the United States Patent and Trademark Office*